No. 823,897. PATENTED JUNE 19, 1906.
G. H. SEARS.
CALCULATING MACHINE.
APPLICATION FILED MAY 24, 1902.
5 SHEETS—SHEET 1.
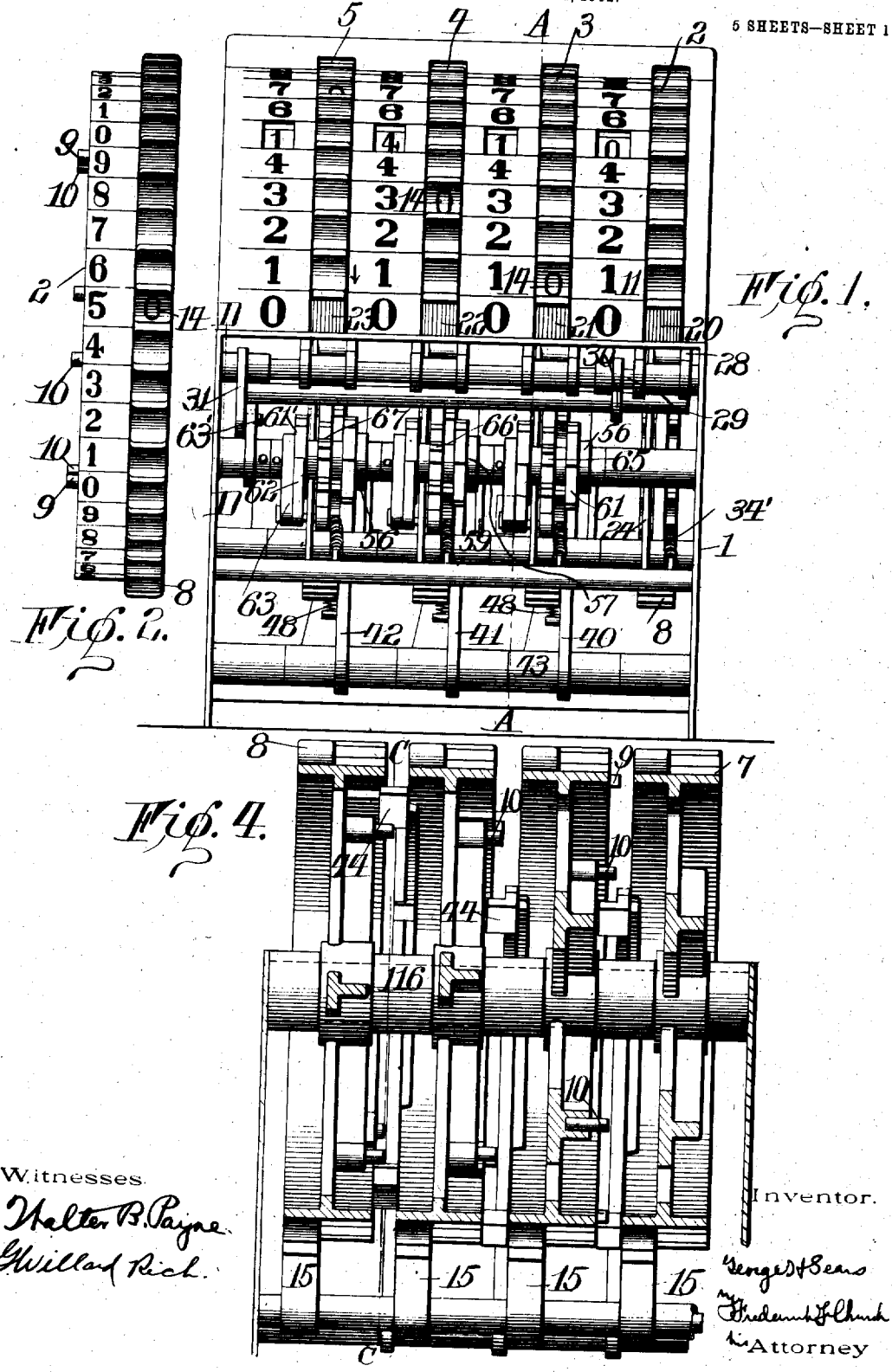

No. 823,897. PATENTED JUNE 19, 1906.
G. H. SEARS.
CALCULATING MACHINE.
APPLICATION FILED MAY 24, 1902.

5 SHEETS—SHEET 2.

Witnesses

Inventor.
George H. Sears
Attorney

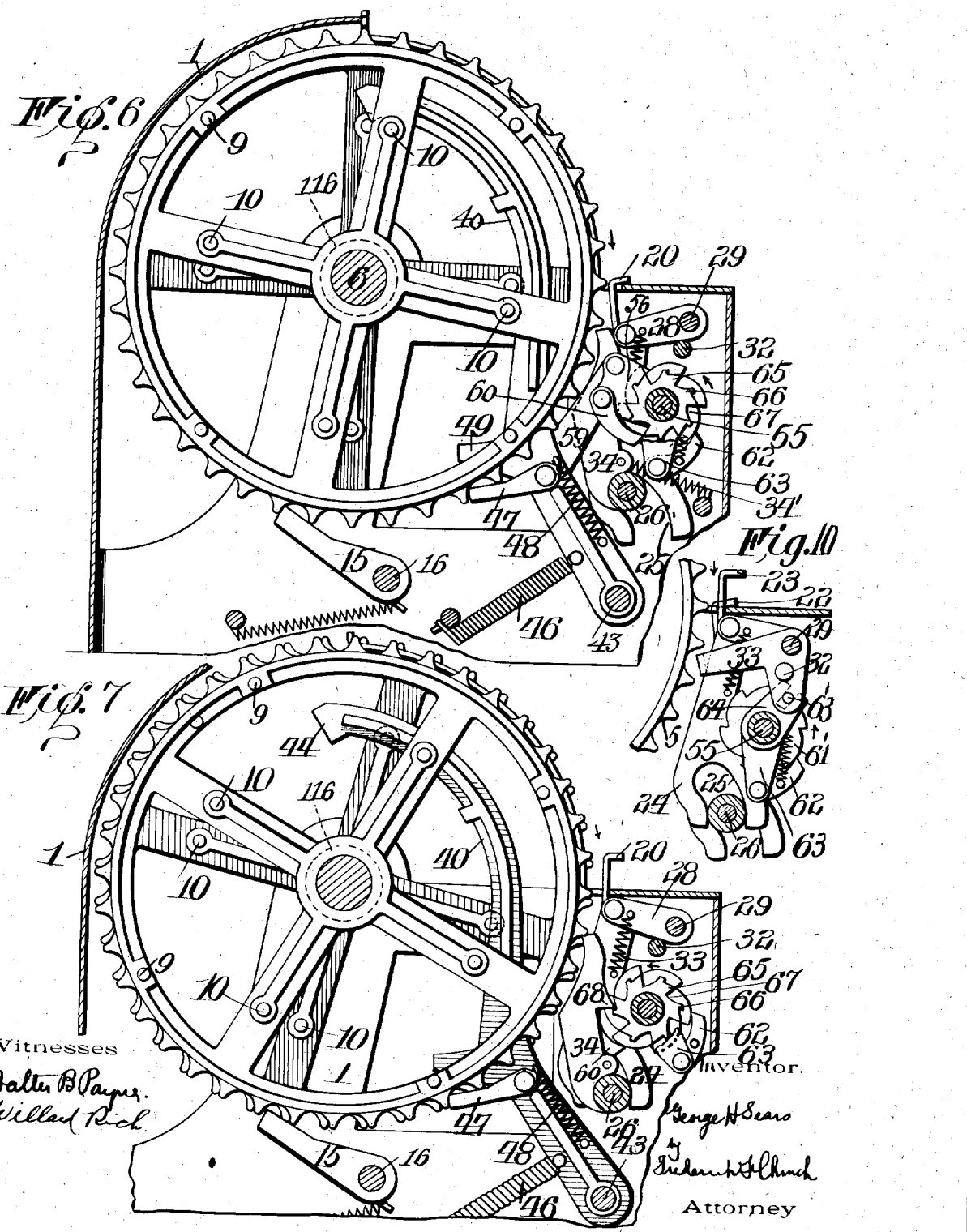

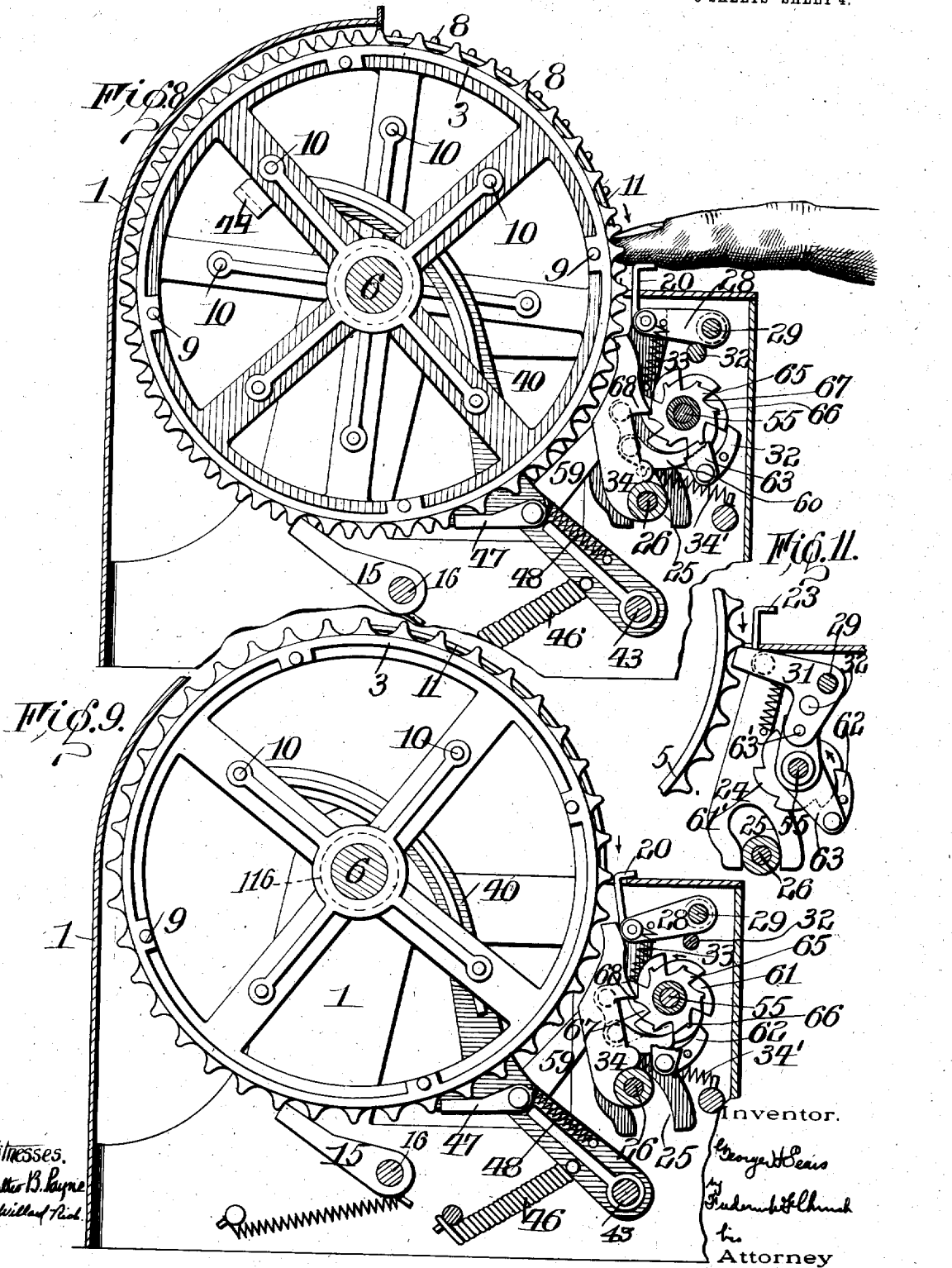

No. 823,897. PATENTED JUNE 19, 1906.
G. H. SEARS.
CALCULATING MACHINE.
APPLICATION FILED MAY 24, 1902.
5 SHEETS—SHEET 5.
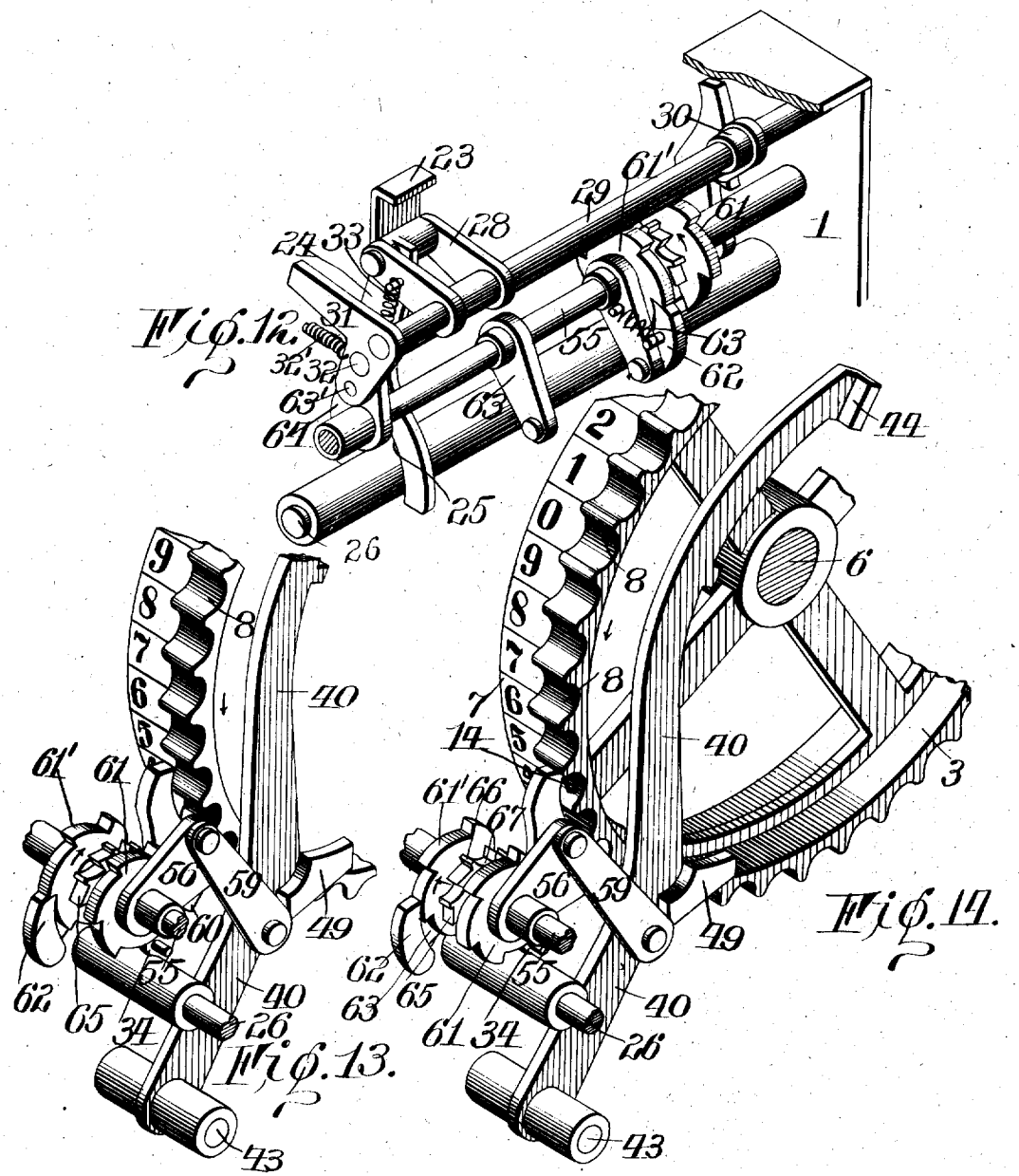
Witnesses
Walter B. Payne
G. Willard Rich
Inventor.
George H. Sears
by Frederick H. Church
his Attorney

UNITED STATES PATENT OFFICE.

GEORGE H. SEARS, OF ROCHESTER, NEW YORK, ASSIGNOR, BY DIRECT AND MESNE ASSIGNMENTS, OF THREE-FOURTHS TO WARREN B. HUTHER AND ANGUS E. HUTHER, OF ROCHESTER, NEW YORK.

CALCULATING-MACHINE.

No. 823,897.　　　　Specification of Letters Patent.　　Patented June 19, 1906.

Application filed May 24, 1902. Serial No. 108,866.

*To all whom it may concern:*

Be it known that I, GEORGE H. SEARS, of Rochester, in the county of Monroe and State of New York, have invented certain new and useful Improvements in Calculating-Machines; and I do hereby declare the following to be a full, clear, and exact description of the same, reference being had to the accompanying drawings, forming a part of this specification, and to the reference-numerals marked thereon.

My invention relates to calculating-machines, and particularly to that class known as "adding-machines," and it embodies generally a plurality of counter-wheels capable of independent operation, carrying suitable figures adapted to coöperate with suitable indices, whereby the total amount may be readily determined.

My invention further includes transfer devices or carrying mechanism whereby computations on the units, tens, or hundreds wheel when equal to or exceeding ten will cause the wheel indicating the next higher column to be actuated, and it also embodies locking mechanism between each wheel and the next higher one whereby an error in their manipulation will cause each of them to be arrested, indicating to the operator in which column an error has occurred.

To these and other ends my invention consists in certain improvements in construction and combination of parts, all as will be fully described, the novel features being pointed out in the claims at the end of the specification.

Figure 3:
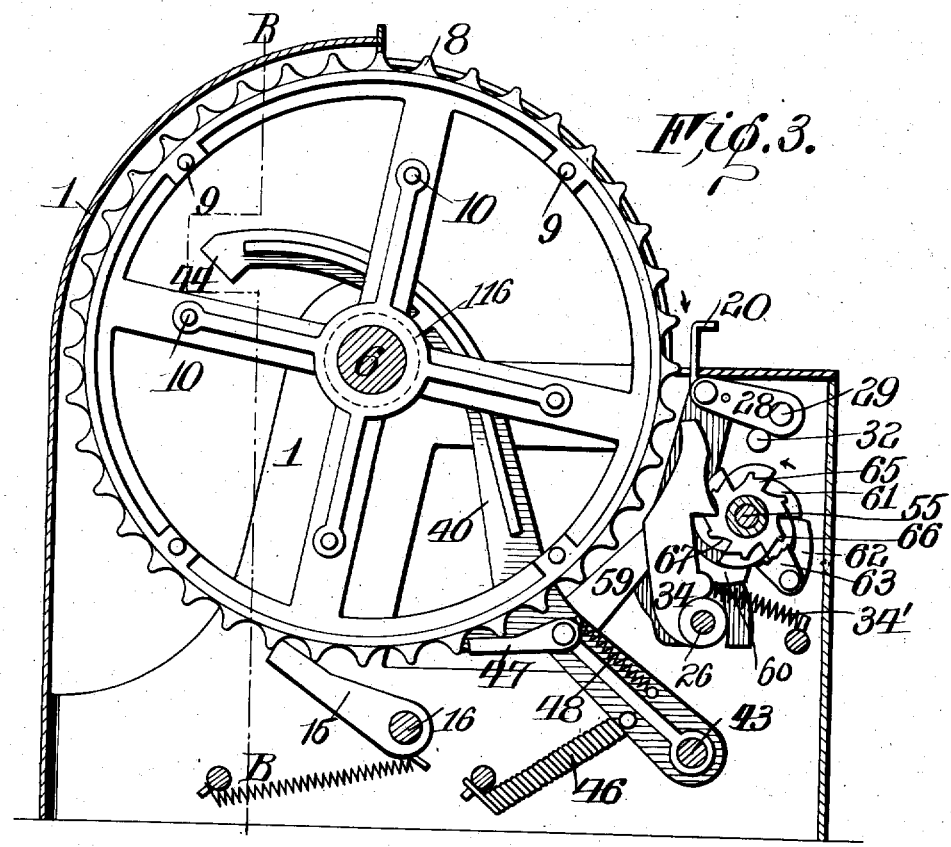
Figure 5:
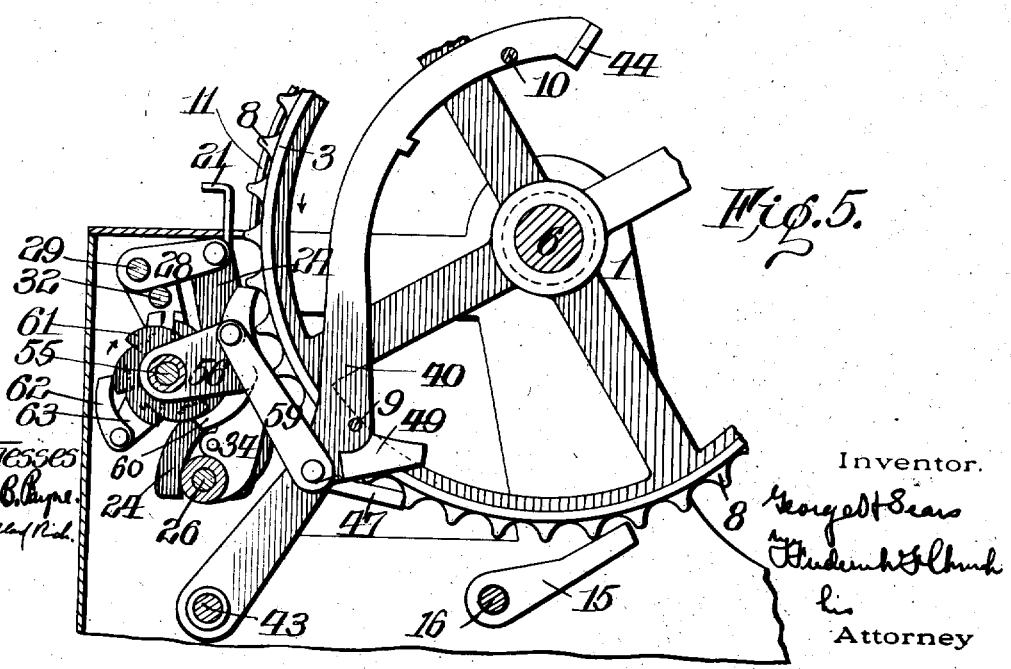

In the drawings, Figure 1 is a front elevation of a calculating-machine constructed in accordance with my invention. Fig. 2 is an edge view of one of the counter-wheels. Fig. 3 is a cross-sectional view thereof on the line A A of Fig. 1. Fig. 4 is a sectional view on the line B B of Fig. 3. Fig. 5 is a sectional view on the line C C of Fig. 4. Figs. 6, 7, 8, and 9 are cross-sectional views similar to Fig. 3, illustrating the device in various positions. Figs. 10 and 11 are detail sectional views taken on the line D D of Fig. 1. Fig. 12 is a perspective view of detached parts of the locking mechanism, and Figs. 13 and 14 are similar views illustrating the operation of the carrying and locking mechanisms.

Similar reference-numerals in the several figures indicate similar parts.

A calculating-machine constructed in accordance with my invention embodies a frame or casing 1, in which is arranged a series of counter-wheels, (indicated by 2, 3, 4, and 5,) which are journaled loosely upon a shaft 6. The several counter-wheels are similar, and a description of one will suffice for all, and in Fig. 2 is shown a detail view of one of them, showing the face or rim 7, provided at one side with the ten figures or digits reading from "0" to "9," the circumference of the wheel being of such a length that ten or a multiple of ten figures may be employed. In the present instance I have employed four multiples, and at one side the rim is provided with teeth or projections 8, one for each figure thereon. On one edge of the rim are laterally-projecting pins 9, and on the spokes are similar pins or lugs 10, the function of which will be further explained, together with the description of the coöperating parts. The casing 1, before referred to, is provided with the curved face, slotted to allow the teeth or projections on the counter-wheels to project therethrough and forming the index-bands 11, which overlie the rims of the wheels and are provided with the figures or digits arranged in successive order from "0" at their lower ends to "9" at their upper ends, and in each of the bands in place of one of the figures, preferably the figure "5," is provided an aperture 13, through which the figures on the counter-wheels may be read, said aperture constituting an indicator for their respective wheels.

At the commencement of a computating or adding operation the several counter-wheels are set so that the zero on each is in line with the aperture or indicator, as shown at the right-hand side of Fig. 1, and to assist the operator in setting the wheels there are provided between certain of the teeth or projections 8 suitable indicia 14, as shown on the wheels 3 and 4 in said figure, whereby the operator may ascertain the required distance to revolve a counter-wheel to bring the zero or character thereon in line with the aperture or indicator. The several counter-wheels arranged side by side correspond to the "units" "tens," "hundreds," "thousands" column, &c., and to add a digit in any of said columns the operator inserts his finger between the teeth 8 thereof opposite the number he desires to add, which is shown on the bands or indexes, and moving it downwardly revolves the wheel in the direction indicated by the arrow in the several figures until his finger reaches the end of the slot in the casing or coöperates with a suitable stop. The rotary movement of the counter-wheels in the opposite direction is prevented by spring-operated dogs or pawls 15, one for each wheel, journaled on a shaft 16 and engaging the teeth 8.

To prevent the spinning of the counter-wheels and arrest their forward movement, I arrange a locking mechanism adapted to be operated at the end of each operation of a counter-wheel. In the present instance this mechanism embodies vertically-movable keys, operating upon suitable pawls adapted to arrest their respective counter-wheels, and operating connections between the carrying devices and said pawls, and a releasing mechanism therefor controlled by the operation of the keys, so that unless the latter are actuated their respective counter-wheels and also the next higher wheel are locked to indicate an error in the computation, all as will be more fully described. These keys are indicated by 20, 21, 22, and 23, each of them being attached to a guide-plate 24, having its lower end provided with a curved slot 25, operating over a rod or shaft 26 and pivotally attached at its upper end to the connected lever-arms 28, loosely journaled on the shaft 29. The keys are adapted to move vertically a distance of one space on the counter-wheel, and the lever connection and curved slot is proportioned in such a manner that as a key is depressed it is moved approximately parallel with the face of its counter-wheel, as shown in Figs. 9 and 10, and retractile springs 33, connected to the arms 28 and to the plates 24, extending across their pivotal point serve to normally support the keys in the elevated position. Journaled on the shaft 26 in line with each counter-wheel is a locking-stop 34, provided at its upper and rear side with a cam-surface adapted to be engaged by the lever-arm 28 on the key when the key is depressed to throw the stop into engagement with the teeth 8 on said counter-wheel, as shown in Fig. 6, to prevent its further forward movement until the key is released.

The carrying devices, by means of which each succeeding counter-wheel is operated from the former, consist of a series of operating-levers (indicated by 40, 41, and 42) located between the counter-wheels, the adjacent counter-wheel at one side serving to actuate the lever and for convenience in explanation being termed the "lower" wheel, while the one operated by said lever is called the "higher" wheel, and as these levers and their connecting parts are similar in construction and operation a description of the details of one will suffice for all.

Each of the operating-levers is provided at one side with a stiffening-rib, as shown, and it is journaled upon the shaft 43 and is provided with the outer end curving over the shaft 6 and adapted to rest upon a collar or buffer 116 of rubber or leather on the shaft 6 when in the inoperative position, as illustrated by dotted lines in Figs. 3, 8, and 9. At the outer end of the lever is provided a face 44, with which successively engage pins 10, carried on the lower counter-wheel, so that the end of the lever is carried upwardly to the position shown in Fig. 6, the parts being so arranged that the pin 10 passes off from the face 44 and only releases the lever as the counter-wheel is operated to record from units to tens in case of the units-wheel or from tens to hundreds or hundreds to thousands, respectively, if this description is applied to the tens or hundreds wheels. The lever being thus released may fall by gravity, or it may be assisted by a spring 46, and in its downward movement it propels the higher adjacent counter-wheel one space by means of a pivoted pawl 47, operated by a light spring 48 and allowed to trip over one of the teeth 8 as the lever is raised and engaging it in rear thereof revolves the higher counter-wheel forward the distance of one space, the rearward movement of the counter-wheel being prevented by the pawl 15, as will be understood. Upon the side of the lever next to the lower or actuating counter-wheel is a lug or projection 49, (see Figs. 5 and 13,) adapted when the lever is elevated to lie in the path of projections or pins 9, formed on the rim of said wheel and corresponding in number to the pins 10 thereon, which latter are arranged one for each set of digits or multiple of ten figures employed upon the counter-wheels. The lug on the lever insures the positive return of the latter and the consequent operation of the adjacent counter-wheel; but if the return of said lever is prevented by means to be further described it causes the lower or actuating counter-wheel to be locked by the pin 9 engaging the lug 49. The counter-wheels are further locked if for any reason there is a failure to properly operate the keys 20, 21, 22, and 23 by mechanism controlled by the carrying devices previously explained and which will now be described. Journaled in the casing is a shaft 55, arranged between the shafts 26 and 29, and loosely mounted thereon are small levers 56 57 58, connected by means of links 59 with their respective operating-levers 40, 41, and 42, said levers 56, 57, and 58 carrying pawls 60, coöperating with ratchet-wheels 61. The latter are also loosely journaled on the shaft 55, and formed integrally with them are similar ratchet-wheels 61', with which coöperate pawls 62 on arms 63, rigidly secured to and operated by the shaft 55 and constituting a part of the releasing mechanism, the operation of which is to be further described. A rocking movement is imparted to this latter shaft by the act of depressing any of the keys 20, 21, 22, or 23 as the arms 28, connected to said keys, engage a rod 32, extending longitudinally beneath them and supported in arms 30 and 31, attached to the shaft 29. One of the supporting-arms is provided with an extended end carrying a pin 63', operating in a slot in an arm 64, attached to the rock-shaft and forming a toggle connection therewith, and a spring 32', attached to said arm, causes the releasing mechanism to be returned to its normal position after each operation.

The teeth of the ratchet-wheels 61 and 61' are in alinement, and the parts operating thereon are arranged in such manner that the pawls 60, carried upwardly by the operating-levers, operate first upon the downward movement of the respective levers to move the ratchet-wheels a distance equal to one-half the length of a tooth, and the pawls 62, operating through an equal distance, complete their movement, all for a purpose to be presently described. Also attached to the ratchet-wheels 61 and 61' and in the present instance shown as located between them is a governing-wheel positioned in line with and controlling the operation of the locking-stop 34, provided upon its periphery with teeth 65 and 66, arranged in pairs, one pair for each of the teeth on the ratchet-wheels 61 61', and between each of said pairs of teeth are deeper notches or recesses 67. These teeth on the governing-wheel coöperate with a projection 68 on the stop 34 and serve to move it toward the counter-wheel and to throw its end between two of the teeth 8 thereon, and in case the ratchet-wheels are only revolved one-half a step the projection engaging between the teeth 65 and 66 causes the pawl to lock the counter-wheel. Each operating-lever as it is raised by one of the pins 10 on the lower counter-wheel carries its pawl 47 over one of the teeth 8 on the higher counter-wheel and rotates the lever 56 to retract the pawl 60 a short distance beyond one of the teeth of the ratchet-wheel 61. As the lever is released by the disengagement of the pin 10 it is allowed to fall, the lost motion occurring before the pawl 60 engages the tooth of the ratchet-wheel 61, permitting the pawl 47 to rotate the higher counter-wheel a sufficient distance to advance one tooth beyond the pawl 34 before the latter is actuated by the governing-wheel to lock said higher counter-wheel. Continued manipulation of the lower counter-wheel through a distance of ten spaces without depressing one of the keys 20, 21, 22, or 23 will cause the carrying-lever to be elevated to the position shown in Figs. 5 and 6, when it will be prevented from returning to its normal position by the engagement of its pawl 47 with the locked counter-wheel. If the operator has failed to notice the inoperativeness of the higher counter-wheel and continues to manipulate the next lower one, it in turn will also be locked by one of the pins 9 abutting against the lug or projection 49. This locking operation may occur between any two adjacent counter-wheels and indicates a failure on the part of the operator to depress one of the keys 20, 21, 22, or 23, thereby mechanically indicating a probable error in the computation. If the keys are properly depressed, the rock-shaft 55 is moved to carry the pawls 63 downward, when one of said pawls will engage beneath the next tooth on the ratchet-wheel 61', that has previously been moved one step by the pawl 60, and the rock-shaft being returned to normal position by the spring 32' causes the ratchet-wheels to be moved a second step, the latter movement advancing the governor-wheel one space, and the tooth 66 thereon passing the projection 68 allows the latter to drop into the recess 67. The stop 34 being then retracted by its spring 34' frees its counter-wheel and the latter is advanced one space by the operating-lever in returning to its normal position, as shown in Fig. 3.

The operation of the machine as it occurs in practice will now be described. In the beginning the operator sets all of the counter-wheels so that the zeros or ciphers on each appear beneath the indicators or apertures 13 in the index-bands 11. To do this, the operator begins with the units-wheel, placing his finger in a notch bearing the indicia 14 and revolving it downwardly until the finger engages the key 20, when by depressing the latter the stop 34 is thrown into engagement with the counter-wheel to limit its further movement. The key being then released is returned to the normal position by the spring 33 and the stop is also retracted by the spring 34'. Following this operation the tens, hundreds, and thousands counter-wheels are each set at zero in a similar manner, and in Fig. 1 these wheels (indicated by 3, 4, and 5) are shown with the indicia 14 resting after the last operation opposite the numerals "1," "3," and "7" on the bands 11. This, however, is of no moment, and the operator sets the counter-wheels in the order named by placing his finger over the indicia 14 on each, revolving them forwardly, at the end of which operation all of the counter-wheels stand at zero in the position shown by the wheel 2 in Fig. 1. To clearly comprehend the operation of the parts, let it be considered that it is desired to obtain the sum of the two numbers "721" and "689." Selecting the first number, the operator then revolves the units counter-wheel one space, the tens-wheel two spaces, and the hundreds-wheel seven spaces by engaging his finger with the respective wheels opposite the figures "1," "2," and "7" on the index-bands 11 and rotating the wheels downwardly until his finger engages the keys 20, 21, and 22. Subsequently he operates the several counter-wheels successively in the same manner to add the number "689" by moving the units-wheel nine spaces or teeth, the tens-wheel eight spaces, and the hundreds-wheel six spaces by engaging the teeth 8 with the finger opposite the figures "9," "8," and "6," respectively, on the index-bands 11 and moving it downward until the finger engages the keys at the lower ends of the slots. The numerals on the four counter-wheels appearing through the apertures 13 in the first instance, reading from left to right, are "0 7 2 1." Then when the units-wheel was moved nine spaces the second time one of the pins 10 engages the face 44 on the lever 40, moving it upwardly from the position shown in Fig. 3 to that shown in Fig. 6; but as the sum of nine and one is ten one must be transferred to the next higher or tens counter-wheel. This occurs as the pin 10 passes out of engagement with the face 44 of the operating-lever, the pawl 47 thereon propelling the counter-wheel 3 forward one space as the lever returns to its normal position. During the upward movement of the lever the pawl 60 on the lever 56 was moved around its coöperating ratchet-wheel 61 and engaging therewith, as shown in Fig. 6, revolves the ratchet-wheel in the direction indicated by the arrow in said figure to the position indicated in Fig. 9, and either previous to or simultaneously with the operation of the key 20, dependent upon the number of spaces through which the first wheel is operated before being required to carry one to the tens-wheel. The downward movement of the key 20 carries with it the rod 32, moving the rock-shaft 55 to the position shown in Fig. 10, causing the pawl 62 to engage a tooth on the ratchet-wheel 61', and as the key is released and the shaft returned by the spring 32' the ratchet-wheels are revolved to the position shown in Fig. 11. The first step in the operation of the pawls moves the governor-wheel to throw the stop 34 into operative position, thus locking the adjacent and next higher counter-wheel against further rotation after the carrying movement has been effected until said stop is released by the second step in the movement of its respective ratchet-wheels to carry the tooth 65 of the governor-wheel past the projection 68 on said pawl. The above cycle of operation is completed in turn as the tens counter-wheel is moved the eight spaces and as the hundreds counter-wheel is moved the additional six spaces, so that upon reading the figures now appearing through the apertures we have "1,410," the arithmetical sum of the numbers "721" and "689" which were arbitrarily selected to aid in the description.

While I have shown only four counter-wheels, it will be understood that any desired number may be employed. A different arrangement of the parts may be employed without departing from the spirit of invention—as, for example, instead of using the two ratchet-wheel 61 61' the pawls 60 62 might be arranged to operate successively upon one of them.

I claim as my invention—

1. In a calculating-machine, the combination with a plurality of counter-wheels and carrying devices arranged between adjacent wheels and actuated by one wheel to revolve the other, of a locking mechanism for arresting the movement of the driven wheel operable by the driving-wheel, and devices operated independently of the counter-wheels for releasing said locking mechanism.

2. In a calculating-machine, the combination with counter-wheels and stop devices coöperating therewith, of carrying devices between the wheels actuated by one of them, means for locking the carrying devices controlled by said stop devices.

3. In a calculating-machine, the combination with counter-wheels, of carrying devices operating between the wheels and manually-operated stops for limiting the movement of the wheels and means for locking the carrying devices controlled by the operation of the stops.

4. In a calculating-machine, the combination with a plurality of counter-wheels, of carrying devices actuated by one wheel to move another, stop devices for arresting the movement of the counter-wheels and mechanism controlled by the movement of the stops for governing the movement of the carrying devices.

5. In a calculating-machine, the combination with a plurality of manually-operated counter-wheels and manually-operated stop devices coöperating therewith, of carrying devices and mechanism actuated by the stops for governing the movement of the carrying devices.

6. In a calculating-machine, the combination with counter-wheels of higher and lower orders, a carrying device actuated by the lower wheel and coöperating with the higher one, a governing mechanism arresting movement of the carrying device and means for releasing the latter at the completion of the movement of the lower wheel.

7. In a calculating-machine, the combination with counter-wheels of higher and lower orders, of carrying devices actuated by the lower wheel and coöperating with the higher one, means for locking the carrying devices and a locking device operable to arrest the lower wheel and operating to release the carrying device.

8. In a calculating-machine, the combination with counter-wheels of higher and lower orders and a carrying device actuated by the lower wheel and coöperating with the higher one, of a governor operated by the carrying device to lock it in actuated position and means coöperating with the governor to release said carrying device.

9. In a calculating-machine, the combination with counter-wheels of higher and lower orders and a carrying device actuated by the lower wheel and coöperating with the higher one, of a governor operated by the carrying device to lock it in actuated position and means operated at the completion of the movement of the lower wheel to release said carrying device.

10. In a calculating-machine, the combination with counter-wheels of higher and lower orders, a carrying device actuated by the lower wheel and coöperating with the higher one and a stop for the lower wheel, of a governor actuated by the carrying mechanism and coöperating with the stop to lock the lower wheel and means coöperating with the governor to release said wheel and carrying devices.

11. In a calculating-machine, the combination with counter-wheels of higher and lower orders, a carrying device actuated by the lower wheel and coöperating with the higher one and a stop for the higher wheel, of a governor controlling the movement of the carrying device and actuating the stop and means for operating the governor to release the higher wheel and carrying devices.

12. In a calculating-machine, the combination with counter-wheels of higher and lower orders, a carrying device actuated by the lower wheel and coöperating with the higher one and a stop, of a governor controlling the carrying device and actuating the stop into engagement with one of the wheels and means operated at the completion of the movement of the lower wheel to actuate the governor into position to release said carrying devices and stop.

13. In a calculating-machine, the combination with counter-wheels of higher and lower orders, a carrying device actuated by the lower wheel and coöperating with the higher one and a stop for limiting the movement of the higher wheel, of a governor actuated by the carrying device to operate the stop, mechanism for arresting the movement of the lower wheel coöperating with the governor to release the higher wheel and carrying devices.

14. In a calculating-machine, the combination with counter-wheels of higher and lower orders and carrying devices between them, of means for arresting the higher wheel actuated by the carrying devices, locking mechanism for the latter and means coöperating therewith and with the lower wheel to arrest its movement and release the higher wheel.

15. In a calculating-machine, the combination with a higher and lower counter-wheel, carrying devices engaging the higher wheel and actuated by the lower wheel into operative position and means for locking it in such position, of a device operated at the completion of the movement of lower wheel for releasing the carrying device.

16. In a calculating-machine, the combination with a higher and lower counter-wheel, carrying devices engaging the higher wheel and actuated by the lower wheel into operative position and means for locking it in such position, of a movable member separate from the lower wheel and operated at the completion of the movement thereof to release the carrying device.

17. In a calculating-machine, the combination with counter-wheels and carrying devices between them actuated by one of the wheels, of a locking mechanism operated by the carrying devices to lock the other counter-wheel and separate releasing devices operated independently of the carrying devices for restoring said mechanism to its normal position.

18. In a calculating-machine, the combination with counter-wheels and a carrying device between them and actuated by one of said wheels, of a stop operated by the carrying device to engage the other counter-wheel and releasing devices capable of operation independently of the carrying device for disengaging the stop.

19. In a calculating-machine, the combination with counter-wheels and a carrying device between them, of a stop and operating connections between it and the carrying device, whereby the stop is operated into engagement with one of the counter-wheels to lock it and also lock the carrying mechanism, to prevent its return movement and a releasing device for restoring said parts.

20. In a calculating-machine, the combination with counter-wheels and carrying devices between them, of a stop, connections between it and the carrying mechanism operating the stop into engagement with one of the wheels and preventing the return of the carrying devices, a projection on the other wheel adapted to engage the stop on said carrying device, to limit its movement, and means for disengaging the stop to release the parts.

21. In a calculating-machine, the combination with counter-wheels, and carrying devices between them, of a movable stop adapted to engage one of the wheels, normally held in an inoperative position, a governing device coöperating with the stop, connections between said device and the carrying devices, to move the stop into engagement with the counter-wheel, and means for operating the governing device to release the stop.

22. In a calculating-machine, the combination with counter-wheels having teeth thereon, stops adapted to engage the latter, and separate manually-actuated keys operating the stops to arrest the movement of the counter-wheels, and carrying devices between the wheels, of a governing device for each stop, operating connections between the governing devices and the carrying devices causing the stops to engage their wheels when the carrying devices are operated, and releasing mechanism operated by the keys causing the governing devices to disengage their stops.

23. In a calculating-machine, the combination with counter-wheels having teeth thereon, stops adapted to engage the latter, a separate key for each wheel actuated at the end of the movement of the latter to operate the stop into engagement therewith and carrying devices between the wheels, of a governing-wheel coöperating with the stops, connections between the carrying devices and the governing-wheels to throw the stops into operative position and restoring devices actuated by the keys to operate the governing-wheels and permit the stops to return to the inoperative position.

24. In a calculating-machine, the combination with a plurality of counter-wheels, pawls adapted to engage them, and carrying devices between the wheels, of governing-wheels for the pawls, connections between each of the latter and the carrying devices operated by an adjacent counter-wheel to throw the stop of the next higher counter-wheel into engagement therewith, keys adapted to be operated at the completion of the operation of any of the counter-wheels and restoring devices operated by said keys to revolve any of said governing-wheels, previously operated, to limit the stops operated thereby to be disengaged from their counter-wheels.

25. In a calculating-machine, the combination with relatively arranged higher and lower counter-wheels, stops adapted to engage therewith, the stop engaging with the higher wheel having a projection and carrying device between the counter-wheels, of a governing-wheel provided with teeth arranged in pairs having recesses between said pairs of teeth and adapted to coöperate with the projection on said stop, a ratchet-wheel connected to the governing-wheel and a pawl coöperating with said ratchet-wheel operated by the carrying device to actuate the governing-wheel and move the stop into engagement with its counter-wheel, movable keys independently operating the stops to arrest the movement of their respective counter-wheels and a restoring device actuated by each key to move the governing-wheel one space to permit the stop to return to its inoperative position.

26. In a calculating-machine, the combination with relatively arranged higher and lower counter-wheels having teeth thereon, an operating-lever between them coöperating with the higher wheel to actuate it, a projection on the lower wheel for operating the lever, as the wheel is revolved, means for locking the higher counter-wheel and releasing devices operated at the completion of the movement of the lower wheel.

27. In a calculating-machine, the combination with relatively movable higher and lower wheels, of an operating-lever carrying a pawl adapted to engage the higher wheel and provided with a stop, a projection on the lower wheel operating the lever to cause the pawl thereon to be raised into engagement with the counter-wheel, locking mechanism operated by the lever to prevent the movement of said higher counter-wheel, a projection on the lower wheel adapted to engage the stop on the lever to limit its movement until the higher wheel is released, and mechanism operated at the completion of the movement of the lower wheel for releasing the higher counter-wheel.

28. In a calculating-machine, the combination with relatively higher and lower counter-wheels having a plurality of series of numerals thereon reading from zero to nine, means for limiting the rotation of a wheel through a distance of more than the space occupied by the ten figures at a single operation, of a member coöperating with the higher wheel, projections on the lower wheel arranged one for each multiple of the ten figures thereon and adapted to operate the member into position to advance the higher counter-wheel one space, a locking mechanism preventing the operation of said wheel and releasing devices for the locking mechanism actuated at the completion of the operation of the lower wheel.

29. In a calculating-machine, the combination with relatively higher and lower counter-wheels having a plurality of series of numerals thereon reading from zero to nine, an index-plate extending over the wheels provided with indicators coöperating with a single figure on each wheel and having figures corresponding to those on the wheels and locking devices adapted to engage the wheels, of a key operated at the completion of each movement of a counter-wheel to throw the locking devices into engagement therewith, an operating member adapted to engage the higher wheel, a projection arranged upon the lower wheel for each multiple of ten figures thereon adapted to operate the member into position to advance the higher counter-wheel one space, connections between the locking mechanism and the member to prevent the movement of the latter and a releasing device actuated by the key.

30. In a calculating-machine, the combination with the separately-operable units, tens and hundreds counter-wheels having operating portions at their peripheries, automatic carrying mechanism between the wheels, locking devices for arresting said wheels actuated by the carrying mechanism and devices for releasing the locking mechanism arranged in proximity to the operating portions of the wheels.

31. In a calculating-machine, the combination with the separately-operable counter-wheels having operating portions at their peripheries, automatic carrying mechanism between the wheels, locking devices for the wheels controlled by the carrying mechanism and releasing devices for the locking devices having operating portions in proximity to the operating portions of the wheels.

32. In a calculating-machine, the combination with the separately-operable counter-wheels having operating portions at their peripheries, carrying devices between them, locking devices for the wheels and means arranged in proximity to the operating portions of the wheels for releasing the locking devices at the end of the operating movement of the wheels.

33. In a calculating-machine, the combination with separately-operable counter-wheels, locking devices for arresting said wheels and carrying mechanism between the latter, connections between it and said locking devices and a releasing mechanism, of an operating member coöperating alternately with the locking devices and the releasing mechanism.

34. In a calculating-machine, the combination with separately-operable counter-wheels having operating portions at their peripheries, locking devices for arresting their movement and carrying mechanism between the wheels, connections between said mechanism and the locking devices and a releasing mechanism for the latter, of a key arranged in proximity to the operating portions of the wheels adapted to coöperate alternately with the locking devices and the releasing mechanism.

35. In a calculating-machine, the combination with counter-wheels, a pivoted lever operating between them adapted to engage one of the wheels, and a projection on the other wheel adapted to engage the lever to move it into the operative position, of locking-stops pivoted in front of each wheel, manually-operated keys for engaging said stops to throw them into engagement with their counter-wheels and governing-wheels, located in rear of the stops, having teeth arranged in pairs and provided with recesses between each pair of teeth, connections between the respective lever and governing-wheel for each counter-wheel, operating to actuate the stop into engagement with its counter-wheel, a rock-shaft, operated by the keys, and connections between the shaft and governing-wheels to move the latter and permit the stop controlled thereby to be disengaged from its counter-wheel.

36. In a calculating-machine, the combination with a higher and a lower counter-wheel having teeth thereon, a pivoted lever operating between them and carrying an operating-pawl, a projection on the lower wheel coöperating with the lever to raise it and carry the pawl over a tooth on the higher counter-wheel and pawls preventing the rearward movement of said wheels, of a pivoted stop in line with each wheel having a cam-surface thereon, a governing device engaging said stop to alternately throw it into engagement with the teeth on the wheel and to release it and a ratchet-wheel connected to the governing device, a toggle connected to the lever and carrying a pawl engaging the ratchet-wheel whereby the governing device is actuated to engage the stop with the counter-wheel, a key movable into engagement with the stop to independently operate it and devices connected to the key to actuate the governing device and release the stop.

37. In a calculating-machine, the combination with a higher and a lower counter-wheel having teeth thereon and pawls limiting their movement in one direction, of an operating-lever extending between them having an engaging face and carrying a pawl engaging the teeth on the higher wheel, a projection on the lower wheel coöperating with the face on the lever to operate the latter and carry the pawl thereon over one tooth on the higher counter-wheel, a locking mechanism actuated by the lever to arrest the movement of said counter-wheel and releasing devices.

38. In a calculating-machine, the combination with a plurality of counter-wheels, carrying devices arranged between the wheels and a stop for each counter-wheel, separate governing devices for each stop to alternately operate and release them, a shaft, and ratchet-wheels journaled thereon and attached to said governing devices, of arms connected to the carrying devices, journaled on the shaft and carrying pawls coöperating with the ratchet-wheels to cause the stops to be thrown into operative position, separate arms rigidly attached to the shaft provided with pawls also coöperating with said ratchet-wheels to cause the stops to be released and means for rocking said shaft.

39. In a calculating-machine, the combination with a plurality of counter-wheels having teeth, carrying devices between them and pivoted stops adapted to engage the wheels having cam-surfaces and projections, a rockshaft having arms thereon, of ratchet-wheels journaled on the shaft, projections carried on the ratchet-wheels engaging the projections on the stops to throw the latter into engagement with their respective counter-wheels, and arms journaled on the shaft having pawls thereon engaging the ratchet-wheels and connected to the carrying devices, separate pawls coöperating with the ratchet-wheels carried by the arms attached to said rock-shaft, a key for each counter-wheel adapted to be moved into engagement with the cam-surface on its respective stop, a bar adapted to be moved by the operation of any of the keys and connections between the bar and rock-shaft.

40. In a calculating-machine, the combination with a higher and a lower counter-wheel and carrying mechanism engaging the higher wheel, of means on the lower wheel for actuating said mechanism into the operative position and releasing it whereby the carrying mechanism operates the higher counter-wheel independently of the lower wheel.

GEORGE H. SEARS.

Witnesses:
G. WILLARD RICH,
ELIZABETH J. PERRY.